United States Patent Office 3,723,073
Patented Mar. 27, 1973

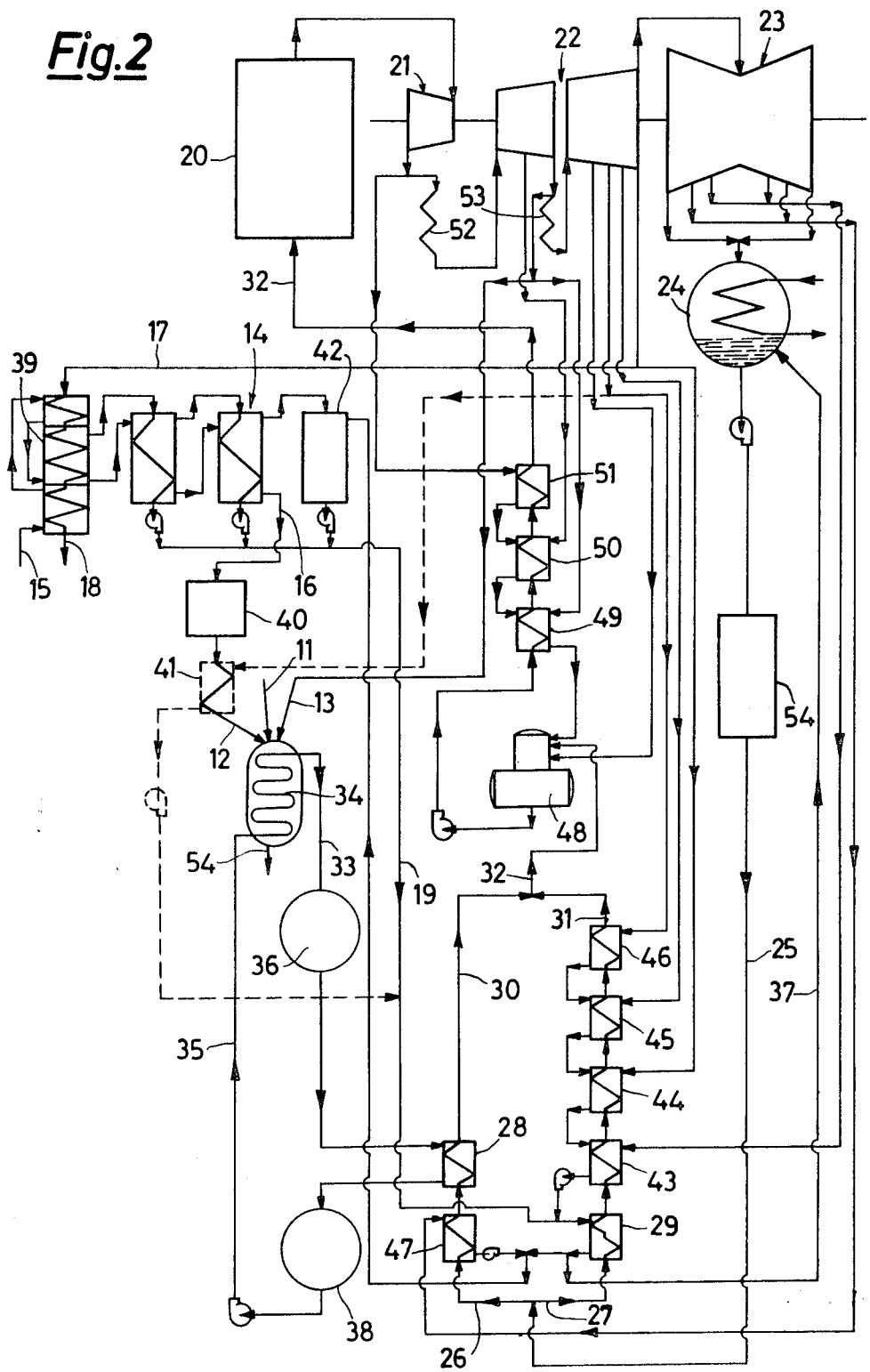

3,723,073
INSTALLATION FOR RECOVERING ELECTRIC POWER, COMBINED WITH AN ALUMINA MANUFACTURING INSTALLATION
Francesco Ettore Conti, Via Sismondi 3, Milan, Italy
Filed May 26, 1969, Ser. No. 827,869
Claims priority, application Italy, June 3, 1968,
17,285/68
Int. Cl. C01f 7/06
U.S. Cl. 23—293                                12 Claims

ABSTRACT OF THE DISCLOSURE

An installation for producing electric power from heat recovered in an alumina producing installation run according to the Bayer process is disclosed, in which a combination of heat exchanging means is provided, for recovering the heat produced in the reaction of bauxite with a caustic alkali, and also for recovering the heat from steam used in the several stages of the power-generating turboalternator which is an integral part of the power station fed by waste heat. A considerable overall efficiency is obtained, so that the electric power produced with recovered heat is a remunerative by-product.

---

Figure 1:
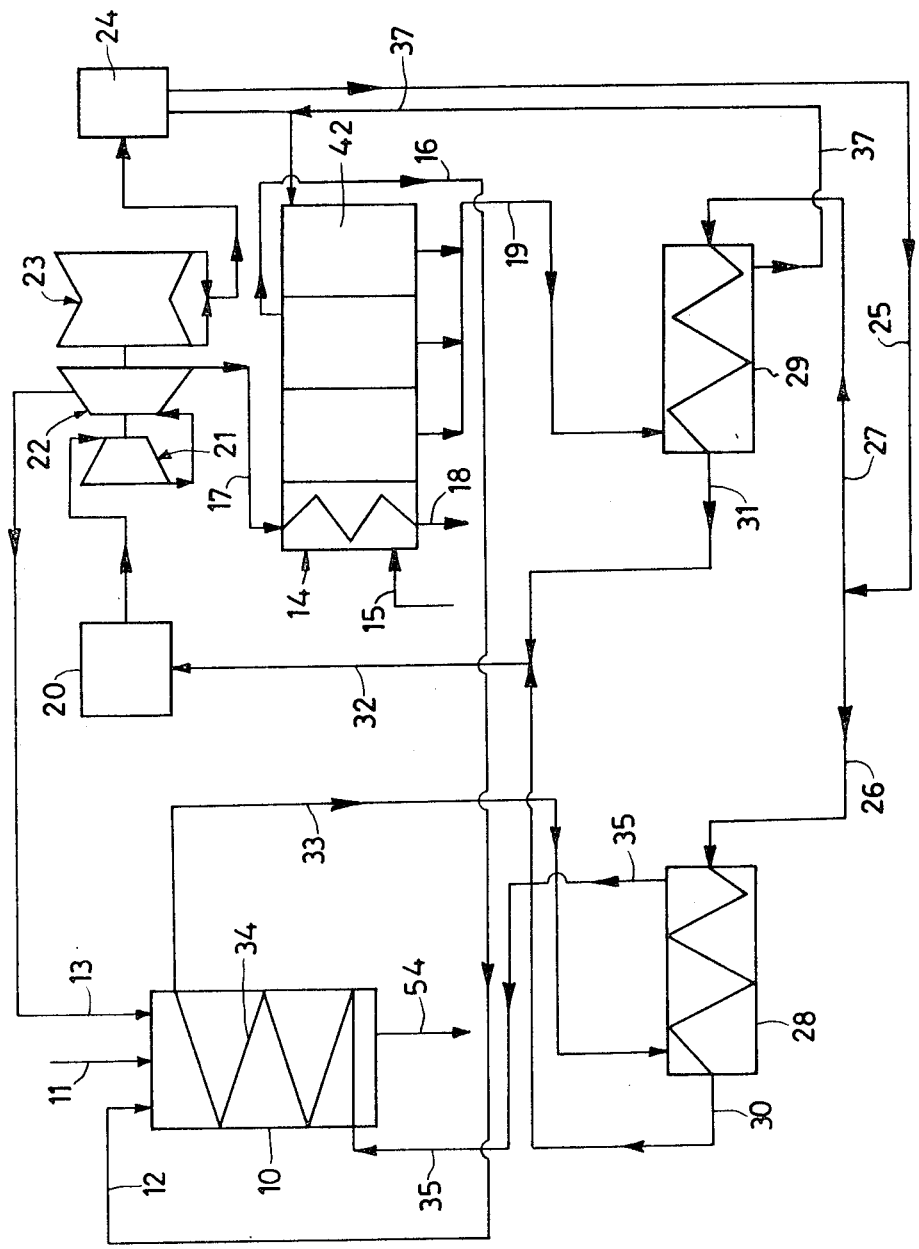

This invention relates to an installation for the double combined recovery of heat, in order to produce electric power in a partial-recovery power station, in combination with an installation for producing alumina according to the Bayer method.

Briefly stated, the Bayer method consists in etching in hot conditions bauxite ore with caustic soda so as to bring alumina in solution in the form of sodium aluminate, separating the solution from the insoluble components (red muds), and subsequently precipitating, in specially provided decanting facilities, of the alumina from the solution by lowering the temperature thereof and by dilution, concurrently with seeding of the solution to be decanted with alumina crystalline seeds.

It is necessary, at this stage, to observe that alumina $Al_2O_3$ naturally occurs in several hydration forms and that in general, both monohydrate and trihydrate are present in the bauxites. The trihydrate is more readily soluble, so that it is removed and solubilized by caustic soda at a temperature of at least 150° C., whereas the monohydrate is much less soluble and the temperature of attack in hot condition should reach at least 200° C. in order that a reasonably high production of monohydrated alumina may be obtained.

This is the reason why the temperature for attacking bauxite with hot caustic soda, which in the past was maintained in the neighbourhood of 180° C., is now kept higher, say to 230° C. and above, in the installations run nowadays.

By so doing, also European bauxites, which contain high values of monohydrated alumina, can be commercially exploited.

To obtain a temperature of attack with caustic soda of 230° C., pressurized steam is used, which must thus be at a pressure of at least 30 abs. atmospheres and, in the majority of the cases, is under pressure even of 40 abs. atmospheres.

In turn, the caustic soda which is used for attacking bauxite in hot conditions, becomes considerably diluted upon precipitation of the alumina, so that it is necessary to concentrate it by administering heat thereto, in order to recycle it. Concentration is carried out in many a way, with multistage evaporators in which the heating medium is steam.

From the foregoing considerations, it is apparent that considerable, and even enormous, amounts of heat are in the question and they are, very often, not fully exploited, so that the first cost of the produced alumina is increased.

A number of methods have been envisaged and carried into practice in order to reduce the two sources of heat consumption enumerated above, so reducing the first cost of the product. These recovery methods are well known in the art and have led to a reduction of the specific consumption of heat to as low as 2 kilograms of steam per kilogram of alumina: these methods, however, involve steam pressure of 35 abs. atmospheres and over.

It is well known that a modern trend for factories and industrial installations for large scale production, is towards the autonomous production of electric power. In this connection, it is fitting to recall that, especially in the case of large chemical and metallurgical industries where very high requirements of heat in the form of pressurized steam and of electric power are experienced, partial recovery thermal power stations have been successful and are an asset as compared with the conventional condensation power stations and also with the total-recovery or back-pressure power stations.

If now the above cited values of specific heat consumption are considered in connection with installations for the production of alumina according to the Bayer process, and the amount of the savings which can be obtained with the power stations of the kind referred to above is even roughly evaluated, it is found that the electric power possibly produced with a partial-recovery power station, even if its output is exalted as far as possible by resorting to derivation and condensation generators with very high steam pressures at the turbine inlets and intermediate superheatings, seldom exceeds the value of 0.65 kilowatt-hour per kg. of produced alumina, even taking into account the power supplied to the anciliary apparatus of the installation. If power is produced by a total recovery power station, the value of 70% of the figure cited above can be attained only with difficulty.

Lastly, one should not overlook the fact that the power produced by a power station, more particularly a thermoelectric station, is the useful power, that is the one supplied to consumers outside the factory. It is thus apparent that from the total power produced one should subtract the losses due to auxiliary services, that is, the power should be multiplied by the efficiency of these services; this can be reckoned as 0.925 (this value can be, in small power stations, especially of the total recovery type, as low as 0.875 and even 0.850).

Consequently, the recovery is $0.65 \times 0.925 = 0.6$ kwh. per kg. of produced alumina.

In the light of the foregoing considerations, the principal object of the present invention is to provide, in an installation for the production of alumina according to the Bayer process, as outlined above, an installation for recovering heat from both the reactor in which the attack of alumina with caustic soda is carried out, and from the multistage evaporator used for concentrating the diluted and exhausted soda lye, the recovered heat being supplied to the feeding water of the steam generator of a partial recovery thermal power station.

More particularly, this invention provides, in an installation for the manufacture of alumina combined with a partial recovery power generating station comprising a very-high pressure steam generator and a turbo-alternating machine comprising a high pressure stage, a medium-pressure stage and a low-pressure stage, said installation for the production of alumina according to the Bayer process essentially comprising a pressurized reactor to which suitably pre-treated bauxite is fed with caustic soda at a concentration of at least 38° Baumé and steam, said steam being taken from the medium-pressure stage of said turbo-alternator and an evaporating multi-stage assembly for the concentration of the exhausted and diluted caustic soda lye, fed by steam taken from the low-pressure stage of said turbo-alternator, said evaporating assembly discharging concentrated caustic soda and condensed steam, a first heat-recovering circuit comprising a first heat-exchanging assembly by means of which heat is yielded to the feeding water of said generator by thermal exchange with circulating water (or formed steam) in a coil situated within said reactor, for cooling the reaction mass to a temperature not exceeding 100° C., a second recovery circuit comprising a second heat-exchanging assembly, wherein the feed water for said generator for the heat exchange is heated by the condensed steam mentioned above which comes from the individual stages and from the condenser of the concentration evaporator assembly.

The essential advantage of this invention lies, as it is obvious, in that the amount of heat used for the production of alumina is considerably reduced since, apparently, no fuel consumption in the hearth of the steam generator of the thermo-electric power station.

In order to state precisely, in quantitative terms, the order of magnitude of the advantageous results achieved by the present invention, the following can be observed upon comparison with the conventional systems:

Taking as a basis the above indicated values of specific steam consumption, the calculations give that a thermo-electric power station with partial recovery can yield 2.10 kwh. of recovered electric power per kilogram of produced alumina, including the consumption for ancillary apparatus, and thus 2.10×0.925=1.05 kwh./kg. of produced alumina if the efficiency of the ancillary apparatus of the power station is allowed for.

Since $$\frac{2.10}{0.65} = \frac{1.95}{0.60} = 3.25 \text{ approx.}$$

it is apparent that, if the produced electric power is equal to that obtained by recovery with the conventionally adopted systems in the alumina producing factories, a production of alumina at least 3.25 times as great should be achieved.

Another aspect of the present invention which is worth to be noticed is the specific consumption of steam per kilogram of produced alumina. As a matter of fact, according to the present invention about 5.5 kilograms of steam per kg. of produced alumina, the steam being drawn from any point of the installation and fed to the process of production of alumina, at various pressures, are necessary. Thus it could seem that, since this value is higher than the value indicated above of 2 kilograms of steam per kilogram of alumina produced with other conventional systems, also the specific consumption of heat corresponding thereto are in the same relationship.

According to the present invention, conversely, the total amounts of heat in question, both in attacking bauxite and in concentrating the exhausted caustic soda, are recovered in a great proportion: more particularly, the recovery is of at least 65%, which is yielded to the feed water of the generator in the power station, a saving of specific heat consumption in the order of magnitude of 1150 kilocalories per kg. is obtained.

In the most unfavorable instance, that is assuming that equal amounts of heat are in play for equal specific consumption of heat, the result would be that, to an actual consumption of heat the value of 0.35×5.5=2 kg. steam per kg. of produced alumina should be attributed, that is a value which, in limiting conditions, equals the one of the conventional systems.

In order that the present invention may be better understood, a preferred embodiment thereof will be now described by way of non-limiting example, in connection with the accompanying drawings, wherein:

FIG. 1 is a diagrammatical view of the double heat recovery installation combined with an installation for the production of alumina, and FIG. 2 is a detailed illustration of the installation of FIG. 1.

Having initially reference to FIG. 1, the apparatuses which make up the installation for producing alumina according to the Bayer process illustrated therein comprise a reactor 10 for attacking bauxite in hot conditions with a caustic alkali; for simplification, bauxite has been fed through 11, whereas 12 and 13 indicate the concentrated caustic soda and medium pressure steam feeding lines, respectively. The reactor 10 discharges through 54 the solution of sodium aluminate and exhausted soda and the red muds for the subsequent separation and decanting.

A multistage evaporator 14 is also diagrammatically shown, for the concentration of the exhausted caustic soda, fed through 15 and issuing in its concentrated form through the duct 16 to 12. Through 17 low pressure steam is fed which, after having been passed through the first evaporating stage, is discharged through 18 at a temperature which is slightly higher than that of the diluted soda. From the condenser 42 of the last stage, along with all the other hot condensates of the other evaporators, the already mentioned hot water is discharged through 19, said water coming from the second system of exchange and recovery.

The partial recovery power generation system, well known in the art, comprises a steam generator 20, which feeds, under a very high pressure, the first stage, also called high pressure stage, 21 of the turbo-alternator and then with subsequent steam pressure drops, the respective stage 22 (medium pressure) and 23 (low pressure) until reaching the condenser 24.

The water fed to the generator 20, withdrawn through 25 from the condenser 24 (in the specific case of the diagram) is split into two streams which, through 26 and 27, pass into two heat exchangers 28 and 29 whose respective outlets 30 and 31, through which steam is caused to pass, are united in the duct 32 which feeds the generator 20.

Considering above all the exchanger 28, it is clearly shown that the feed water entering at 26 is heated by hot water (or also steam) coming, through the duct 33, from the heat exchanging coil 34 suitably placed in the interior of the reactor 10 so as to exchange heat with the mass of caustic soda, dissolved sodium aluminate and red muds which is present therein on completion of the reaction. The coil 34 is fed with water by the duct 35 issuing from the exchanger 28. It is understood that the coil can also be fed by another thermal exchange fluid which is caused to flow in a closed circuit.

It is apparent that, under this form, the recovery of heat from the reactor 10 takes place intermittently, that is, upon completion of the attack with caustic alkali in hot conditions for each bauxite batch.

However, the intermittent operation is almost done away with by arranging an appropriate number of reactors in parallel, which are necessary also for not too high alumina outputs, the reactors being suitably phase shifted with respect to one another, and also by adopting continuous reactors in which the reacted mass is passed to cylindrical exchangers (or exchangers of any other kind), in which the exchanging coil is placed.

Considering now the exchanger 29, the feeding water of the generator 20 is heated in the exchanger at the expenses of the sensible heat of the water discharged from the several stages of the multistage evaporator 14, the water being fed through the duct 19 and, after passing through the exchanger 29, being forwarded to the condenser 24 through the duct 37.

Considering now FIG. 2, which shows more completely the preferred embodiment of the present invention as diagrammatically shown in FIG. 1, the same component parts of the installation being indicated, whenever practicable, by the same reference numbers.

Considering, at the outset, the closed circuit of the exchanger 28, it is seen that upstream and downstream thereof, two tanks or reservoirs for water are provided, 36 and 38, respectively.

By so doing, the water stored in the reservoir 38 and at a temperature which is lower than 100° C. by several degrees centigrade, is passed, on completion of the attack of bauxite with hot caustic alkali, through the coil 34 wherein it is heated and fed to the tank 36, wherefrom it feeds the exchanger 28.

Considering now the multistage evaporator 14, it comprises a first evaporator 39, fed with low pressure steam coming from the downstream end of the medium-pressure stage of the turbo-alternator, and thus at the same inlet pressure as the stage 23; the steam flows through the whole stage 39 and is discharged through the duct 18 into a main storage tank for water and condensates. Two additional stages are further provided, through which the caustic soda solution flows and becomes more and more concentrated under decreasing pressures, whereas the condensate is sent to the duct 19 which feeds the exchanger 29. The concentrated soda coming from the outlet 16 of the last evaporation stage, is collected into a reservoir 40 from which it is sent, via the duct 12, to the reactor 10. As shown in dotted lines, in the duct 12 a heat exchanger 41 can be inserted, wherein the concentrated caustic soda is preheated at the expenses of medium pressure steam drawn from the stage 22 of the turbo-alternator.

To the evaporator 14 a condenser 42, generally of the mixture type and already mentioned, is associated, for the condensation of the water coming from the last stage.

Considering the feed circuit of the steam generator 20, several exchangers 43, 44, 45 and 46 are shown, in series with the exchanger 29, further to preheat the feed water of the generator 20 at the expenses of steam drawn from the medium and low pressure stages 22 and 23, of the turbo-alternator. Likewise, an exchanger 47 is provided, serially arranged with respect to the exchanger 28 and fed with low pressure steam taken from the low pressure stage 23.

In the duct 32 feeding the generator 20, a degassing appliance 48 is provided, of the type which is conventional in the steam fed thermoelectric installations, and which feeds a set of serially arranged exchangers 49, 50 and 51, fed by steam drawn from the high and medium pressure stages 21 and 22 of the turbo-alternator. Finally, there have been provided the conventional superheaters 52 and 53 and, downstream of the condenser 24, an installation 54 for conditioning the condensates taken from the condenser. It is apparent that the installation of FIG. 2 has been described by way of summary, in that it aims to offer a mere example without limiting the principles of the present invention. For example, the two recovery heat exchanging circuits could be serially arranged with respect to one another and in such a case there would be no splitting of the water feeding stream to the stream generator. In addition the heat exchangers placed at the several points where steam is drawn can be placed in series or in parallel with respect to the two recovery heat exchanging circuits mentioned above.

The embodiments of the invention in which an exclusive property or privilege is claimed are defined as follows:

1. An installation for the production of electric power with double recovery of heat in combination with an installation for the production of alumina according to the Bayer process and including
   a reactor wherein bauxite is reacted in hot condition with a caustic alkali to obtain a hot mass,
   a turbo-alternator having a steam generator,
   an evaporating assembly wherein exhausted and diluted caustic alkali is concentrated, whereby hot water is produced and discharged,
   first heat exchanging means in which a stream of feed water for said steam generator of said turbo-alternator is heated by thermal exchange with a fluid after the fluid has been passed in heat exchanging relationship with the mass obtained on completion of the reaction of a caustic alkali with bauxite under hot conditions, and
   second heat exchanging means in which feed water for said generator is heated by heat exchange with hot water discharged by said evaporating assembly which concentrates the caustic alkali solution.

2. The installation of claim 1 wherein said turbo-alternator includes a high pressure stage, a medium pressure stage and a low pressure stage.

3. The installation of claim 2 wherein said reactor for the reaction of caustic alkali with bauxite is fed with bauxite, concentrated caustic soda of at least 30° Bé and steam, wherein the mass to be reacted is heated by medium pressure steam drawn from said medium pressure stage of said turbo-alternator to a temperature of from about 180° to about 230° C. and wherein said reactor includes a heat exchanging coil which is part of a closed circuit including
   a heat exchanger and
   a heat exchange fluid within said circuit which is caused to flow through said closed circuit to receive heat from said reacted mass at said coil and to yield heat at said first heat exchanging means to feed water of said steam generator.

4. The installation of claim 3 wherein said heat exchange fluid is water and further wherein two tanks are provided in said closed circuit, one upstream and one downstream of said exchanger.

5. The installation of claim 2 wherein said evaporating assembly is a multi-stage evaporator.

6. The installation of claim 5 wherein said second heat exchanging means comprises a heat exchanger in which feed for said generator is passed in heat exchanging relationship with a stream of hot water discharged from the last stage of said multistage evaporator for the exhausted and diluted caustic alkali and from the preceding stages.

7. The installation of claim 6 further including a tank for the storage of concentrated alkali from said evaporator for introduction into said reactor.

8. The installation of claim 7 wherein said concentrated alkali is taken from said tank and preheated before entering said reactor by passing said concentrated alkali in a heat exchanger fed with medium pressure steam taken from said medium pressure stream of said turbo-alternator.

9. The installation of claim 5 wherein the first stage of said evaporator is fed with low pressure steam drawn from the corresponding stage of said turbo-alternator.

10. The installation of claim 3 wherein said reacted mass is cooled by the fluid passing through said coil at a temperature not exceeding 100° C.

11. The installation of claim 2 wherein said first heat exchanging means is arranged in series with a heat exchanger fed with steam drawn from said low pressure stage of said turbo-alternator.

12. The installation of claim 2 wherein said second heat exchanging means is arranged in series with two or more heat exchangers fed with steam drawn from said medium and low pressure stages of said turbo-alternator.

References Cited
UNITED STATES PATENTS

| | | | |
|---|---|---|---|
| 2,852,343 | 9/1958 | Scandrett | 23—143 |
| 2,946,658 | 7/1960 | Donaldson | 23—143 |
| 3,241,910 | 3/1966 | Johnson | 23—143 |
| 3,413,087 | 11/1968 | Roberts | 23—143 |
| 3,451,220 | 6/1969 | Buscemi | 203—Dig. 20 |
| 3,497,317 | 2/1970 | Tusche | 23—143 |

OTHER REFERENCES

Holbrook: RI 6280, "Extraction of Alumina...", 1963, pp. 13 to 19.

NORMAN YUDKOFF, Primary Examiner

U.S. Cl. X.R.

423—121; 60—50; 165—105, 106